(12) United States Patent
Sohn et al.

(10) Patent No.: US 7,558,161 B2
(45) Date of Patent: Jul. 7, 2009

(54) INTEGRATED OPTICAL SYSTEM AND METHOD OF MANUFACTURING THE SAME AND INFORMATION RECORDING AND/OR REPRODUCING APPARATUS USING THE INTEGRATED OPTICAL SYSTEM

(75) Inventors: Jin-seung Sohn, Seoul (KR); Sung-dong Suh, Seoul (KR); Mee-suk Jung, Suwon-si (KR); Eun-hyoung Cho, Seoul (KR); Hae-sung Kim, Hwaseong-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 569 days.

(21) Appl. No.: 11/141,052

(22) Filed: Jun. 1, 2005

(65) Prior Publication Data

US 2005/0263683 A1    Dec. 1, 2005

(30) Foreign Application Priority Data

Jun. 1, 2004    (KR) ...................... 10-2004-0039627

(51) Int. Cl.
*G11B 7/00*    (2006.01)
(52) U.S. Cl. ................................. 369/44.12; 369/44.14
(58) Field of Classification Search .............. 369/44.11, 369/44.12, 44.14, 44.15, 44.16
See application file for complete search history.

(56) References Cited

U.S. PATENT DOCUMENTS

| | | | |
|---|---|---|---|
| 5,317,551 A | 5/1994 | Shiono | |
| 5,687,155 A | 11/1997 | Fukakusa et al. | |
| 5,812,518 A | 9/1998 | Fukakusa | |
| 6,104,690 A | 8/2000 | Feldman et al. | |
| 6,351,443 B1 | 2/2002 | Freeman | |
| 6,717,893 B1 * | 4/2004 | Niss et al. | 369/44.19 |
| 6,873,580 B2 * | 3/2005 | Zimmer et al. | 369/44.12 |
| 7,283,448 B2 * | 10/2007 | Sohn et al. | 369/112.01 |
| 2003/0103439 A1 | 6/2003 | Horinouchi et al. | |

FOREIGN PATENT DOCUMENTS

| | | |
|---|---|---|
| EP | 0555097 A1 | 8/1993 |
| JP | 63-237491 A | 10/1988 |
| JP | 64-012221 | 1/1989 |
| JP | 64-027045 A | 1/1989 |
| JP | 04-079050 A | 3/1992 |
| JP | 04-089634 A | 3/1992 |

(Continued)

*Primary Examiner*—Nabil Z Hindi
(74) *Attorney, Agent, or Firm*—Sughrue Mion, PLLC

(57) ABSTRACT

An optical system and an information apparatus using the optical system are provided. The optical system includes an optical bench on which a light source and a photodetector including a main photodetector receiving the light are mounted. A lens unit is coupled to the optical bench, and an optical path separating member separates an optical path of light emitted from the light source and propagating toward the lens unit and an optical path of light incident from the lens unit. The optical system may include a monitor photodetector and/or an optical path forming unit coupled to the optical bench. The monitor photodetector receives a portion of the light emitted from the light source. The optical path forming unit includes a first mirror reflecting the light emitted from the light source and a second mirror reflecting the light incident from the lens unit and reflected by the first mirror.

33 Claims, 7 Drawing Sheets

FOREIGN PATENT DOCUMENTS

| | | |
|---|---|---|
| JP | 04-089634 A2 | 3/1992 |
| JP | 4-332185 A | 11/1992 |
| JP | 7-21581 A | 1/1995 |
| JP | 07-201065 A | 8/1995 |
| JP | 08-124205 A | 5/1996 |
| JP | 09-102650 A | 4/1997 |
| JP | 09-246420 A | 9/1997 |
| JP | 11-273136 A | 10/1999 |
| JP | 2002-335032 A | 11/2002 |
| JP | 2003-168239 A | 6/2003 |
| JP | 2004-127339 A | 4/2004 |
| WO | 01/43126 A2 | 6/2001 |

* cited by examiner

INTEGRATED OPTICAL SYSTEM AND METHOD OF MANUFACTURING THE SAME AND INFORMATION RECORDING AND/OR REPRODUCING APPARATUS USING THE INTEGRATED OPTICAL SYSTEM

BACKGROUND OF THE INVENTION

This application claims priority to Korean Patent Application No. 10-2004-0039627, filed on Jun. 1, 2004, in the Korean Intellectual Property Office, the disclosure of which is incorporated herein in its entirety by reference.

1. Field of the Invention

The present invention relates to an information recording and/or reproducing apparatus, and more particularly, to an integrated optical system and a method of manufacturing the same, and an information recording and/or reproducing apparatus employing the integrated optical system.

2. Description of the Related Art

In an optical recording and/or reproducing apparatus that records arbitrary information on an optical information storage medium and reproduces information recorded on the optical information storage medium by focusing laser light using an objective lens, the recording capacity is determined according to the size of a focused light spot. The size (S) of a focused light spot is determined according to the wavelength ($\lambda$) of laser light and the numerical aperture (NA) of an objective lens is expressed below by Equation (1).

$$S \propto \lambda/NA \qquad \text{Equation (1)}$$

Therefore, in order to reduce the size of a light spot focused on an optical information storage medium for a higher recording density, research into an optical recording and/or reproducing apparatus using a short wavelength light source such as a blue laser and an objective lens having an NA of 0.6 or greater has been conducted.

Since the development of compact discs (CDs) that require light with a wavelength of 780 nm and an objective lens having an NA of 0.45 or 0.5 to record information thereon and/or reproduce information therefrom, intensive research has been conducted into increasing the recording density and information storage capacity of the media. Digital versatile discs (DVDs), to/from which information can be recorded and reproduced using light having a wavelength of 650 nm and an objective lens having an NA or 0.6 or 0.65, were obtained as a result of the research.

Recently, there has been steady progress in research into high-density information storage media using blue light having a wavelength of, for example, 405 nm, and having a recording capacity of 20 GB or greater.

There have been efforts to standardize high-density optical information storage media using blue light having a wavelength of, for example, 405 nm, and standards are being defined. A NA of an objective lens for a high-density optical information storage medium is 0.65 or 0.85, which will be described later.

The thickness of a DVD is reduced to 0.6 mm from 1.2 mm of a CD to provide adequate tolerance for tilting of the optical information storage medium because the NA of an objective lens is increased to 0.6 for the DVD from 0.45 for the CD.

In a high-density optical information storage medium having a higher storage capacity than a DVD, when the NA of an objective lens is increased to, for example, 0.85, the thickness of the high-density optical information storage medium must be reduced to about 0.1 mm.

A high-density optical information storage medium that has a reduced thickness and requires a greater NA objective lens is referred to as a Blu-ray Disc (BD). According to the standard for BDs, the wavelength of a light source is 405 nm, and the NA of an objective lens is 0.85. The standard thickness of BDs is about 0.1 mm.

In addition to BDs, (high definition) HD DVDs are currently under development as high-density optical information storage media. HD DVDs have the same substrate thickness and require an objective lens having the same NA as DVDs. Only the wavelength of a standard light source, that is, a blue wavelength of, for example, 405 nm, matches the standard for BDs.

In addition to the requirement for high-density, high-capacity optical information storage media, there is a need for a slimmer, smaller optical system constituting an optical pickup.

Along with the increasing need for the adoption of optical recording and/or reproducing apparatuses in portable terminals, such as personal digital assistants (PDAs), mobile phones, digital cameras, portable disc players, camcoders, etc., there has been an increasing need for slim optical pickups. For use in the field of portable terminals, optical pickups should be slim and small and be able to record and/or reproduce a large amount of information, such as music, moving pictures, etc., at high density.

However, there are technical limitations in manufacturing a small, slim optical system by reducing the sizes of optical elements constituting a conventional optical pickup that is currently used in optical recording and/or reproducing apparatuses for CDs and/or DVDs.

Furthermore, a conventional optical pickup is constructed by optically aligning and bonding a plurality of individually manufactured optical elements. Therefore, due to possible assembling errors in the assembling and aligning of parts, the reliability of the assembled optical pickup and the degree of automation are lowered.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides an integrated optical system that satisfies the requirements for small, slim device and can be manufactured through a micro-electro-mechanical system (MEMS) process, a method of manufacturing the integrated optical system and an information recording and/ or reproducing apparatus using the integrated optical system as an optical module or an optical pickup.

According to an aspect of the present invention, there is provided an integrated optical system that comprises an optical bench on which a light source generating light and at least one photodetector comprising a main photodetector receiving the light are mounted. The integrated optical system further comprises a lens unit coupled to the optical bench, and an optical path separating member separating an optical path of light emitted from the light source and propagating toward the lens unit and an optical path of light incident from the lens unit. The integrated optical system also comprises an optical path forming unit coupled to the optical bench. The optical path forming unit comprises a first mirror reflecting the light emitted from the light source to the lens unit and a second mirror reflecting the light incident from the lens unit and reflected by the first mirror to the main photodetector.

The at least one photodetector may further comprise a monitor photodetector, which is disposed on the optical bench and directly receives some of the light forwardly emitted from the light source.

The main photodetector and the monitor photodetector may be disposed on a bottom surface of the optical bench, and the light source may be mounted on a mount and spaced apart from the bottom surface of the optical bench.

The monitor photodetector may be mounted so as to be parallel to the light source, slanted toward the light source or spaced apart from the bottom surface of the optical bench.

The light source may be mounted on a mount.

The light source may be interposed between the first and second mirrors.

The optical path separating member may comprise a diffraction optical element. The optical path separating member may comprise a polarization diffraction element and a quarter-wave plate.

A receiving groove with an opening may be formed in the optical bench, and the optical path separating member may be inserted into the receiving groove.

The integrated optical system may further comprise connection elements, such as wires and terminals, for electrical connection between the light source and the at least one photodetctor and external circuits. The connection elements are formed on a substrate of the optical bench.

According to another aspect of the present invention, there is provided an integrated optical system comprising an optical bench on which a light source that generates light and a monitor photodetector that receives some of the light emitted from the light source are mounted. The integrated optical bench further comprises a lens unit coupled to the optical bench and an optical path separating member. The optical path separating member separates an optical path of light emitted from the light source that propagates towards the lens unit and an optical path of light incident from the lens unit.

The monitor photodetector may be disposed on a bottom surface of the optical bench, and the light source may be mounted on a mount and spaced apart from the bottom surface of the optical bench.

The monitor photodetector may be mounted so as to be parallel to the light source, slanted toward the light source or spaced from the bottom surface of the optical bench.

The light source may be mounted on a mount.

The integrated optical system may further comprise a main photodetector mounted on the optical bench. The integrated optical system may further comprise electrical elements, such as wires and terminals, for electrical connection between the light source, the main photodetector, the monitor photodetector and external circuits, wherein the electrical elements are formed on a bottom surface of the optical bench.

The lens unit may comprise at least one of a refractive lens, a diffractive lens and a gradient index (GRIN) lens.

The lens unit may comprise a hybrid lens comprising the refractive lens and the diffractive lens.

The lens unit may comprise the refractive lens and the diffractive lens, wherein the refractive lens may function as an objective lens and the diffractive lens may function as a collimating lens.

The lens unit may be structured such that the diffractive lens functioning as a collimating lens is formed at one surface of a lens holder and conversion can be selectively made between an optical module for an optical pickup and an optical pickup by selectively inserting the refractive lens functioning as an objective lens into the lens holder.

The lens unit may use the refractive lens, the diffractive lens or the GRIN lens functioning a collimating lens so that the integrated optical system can be used as an optical module for an optical pickup.

According to still another aspect of the present invention, there is provided a method of manufacturing an integrated optical system. The method comprises preparing an optical bench wafer on which the optical bench is formed and preparing an optical path forming unit wafer on which the optical path forming unit is formed. The method further comprises bonding the optical path forming unit wafer to the optical bench wafer and dicing the bonded wafers to obtain an optical bench and optical path forming unit assembly.

According to yet another aspect of the present invention, there is provided a method of manufacturing an integrated optical system. The method comprises preparing an optical bench wafer on which the optical bench is formed, attaching the optical path forming unit to the optical bench formed on the optical bench wafer and dicing the optical bench wafer to which the optical path forming unit is attached to obtain an optical bench and optical path forming unit assembly.

According to a further aspect of the present invention, there is provided a method of manufacturing an integrated optical system. The method comprises preparing an optical bench wafer on which the optical bench is formed, dicing the optical bench wafer and attaching the optical path forming unit to the optical bench to obtain an optical bench and optical path forming unit assembly.

The optical path forming unit may be formed on a wafer.

According to another aspect of the present invention, there is provided an information recording and/or reproducing apparatus that comprises an integrated optical system as described above. The apparatus further comprises an information storage medium rotating unit rotating an information storage medium, a driving unit driving the integrated optical system and the information storage medium rotating unit, and a control unit controlling the driving unit to control focusing and tracking servos.

The integrated optical system may be used as an optical pickup.

The information recording and/or reproducing apparatus may further comprise an objective lens focusing incident light on the information storage medium, and the integrated optical system may be used as an optical module.

Additional aspects and/or advantages of the invention will be set forth in part in the description that follows and, in part, will be apparent from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

The present invention will now be described more fully with reference to the accompanying drawings, in which exemplary, non-limiting embodiments of the invention are shown.

Figure 1:
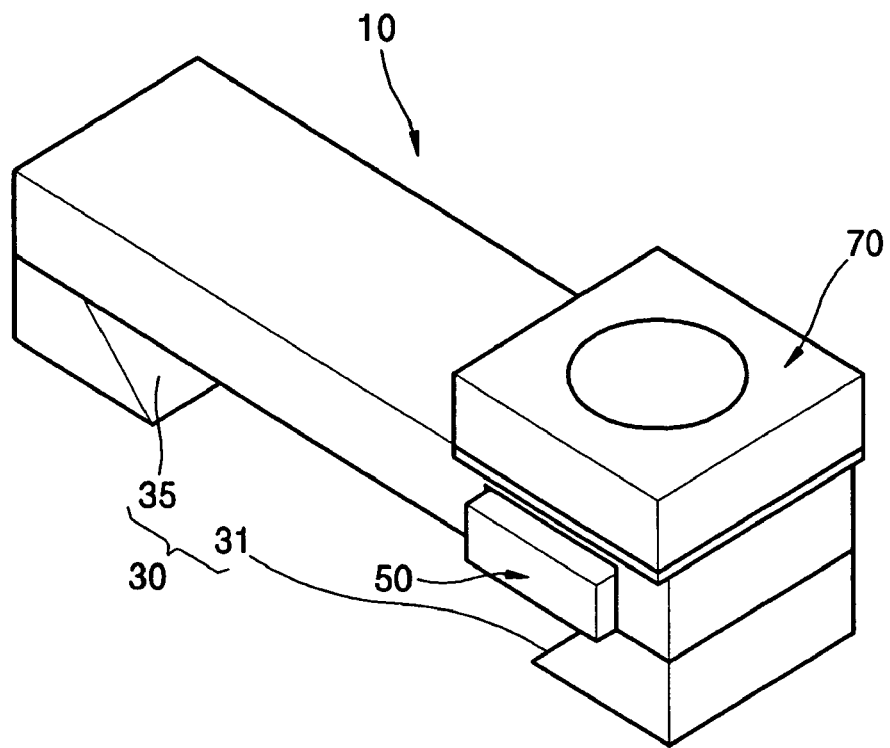
FIG. 1 is a schematic perspective view of an integrated optical system according to an exemplary embodiment of the present invention.
Figure 2:
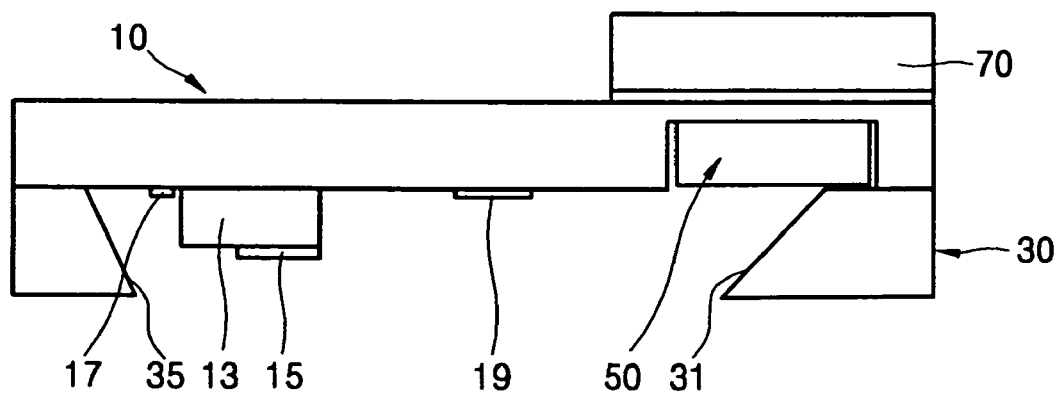
FIG. 2 is a side view of the integrated optical system of FIG. 1.
Figure 3:
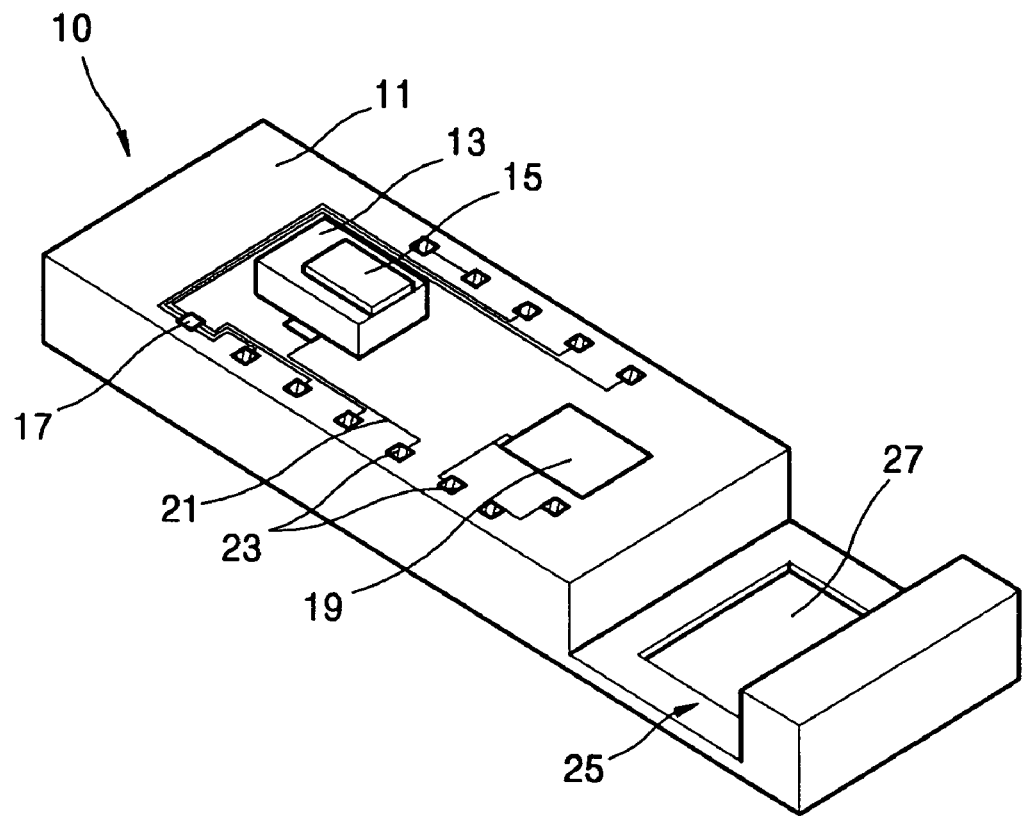
FIG. 3 is a perspective view of an optical bench of the integrated optical system of FIG. 1.

FIG. 1 is a schematic perspective view of an integrated optical system according to an exemplary embodiment of the present invention. FIG. 2 is a side view of the integrated optical system of FIG. 1. FIG. 3 is a perspective view of an optical bench 10 of the integrated optical system of FIG. 1.

Referring to FIGS. 1, 2 and 3, the integrated optical system according to an exemplary embodiment of the present invention comprises the optical bench 10 on which a light source 15 and at least one photodetector comprising a main photodetector 17 are mounted. The integrated optical system further comprises a lens unit 70 and an optical path forming unit 30 coupled to the optical bench 10, and an optical path separating member 50 separating an optical path of light emitted from the light source 15 propagating toward the lens unit 70 and an optical path of light reflected by an information storage medium 1 and then incident on the lens unit 70. The integrated optical system may be used as an optical pickup module or an optical pickup according to the construction of the lens unit 70. The at least one photodetector may comprise the main photodetector 17 and a monitor photodetector 19 disposed on the optical bench 10 to directly receive some of the light forwardly emitted from the light source 15.

Referring to FIG. 3, the optical bench 10 of the exemplary embodiment is a silicon optical bench (SIOB). The optical bench 10 comprises the light source 15, the main photodetector 17 and the monitor photodetector 19, which are disposed on a substrate.

The substrate of the optical bench 10 may be a silicon wafer. The optical bench 10 may be manufactured through a wafer process in which an optical bench wafer is formed using a micro-electro-mechanical system (MEMS) process.

The light source 15 is a semiconductor laser emitting light of a predetermined wavelength. The light source 15 may be a semiconductor laser emitting light having a blue wavelength, for example, a wavelength of 405 nm. In this case, the integrated optical system can record information on and/or reproduce information from a blu-ray disc (BD) or a high definition (HD) DVD.

Further, the light source 15 may be a semiconductor laser emitting light having a red wavelength, for example, a wavelength of 650 nm. In this case, the integrated optical system can record information on and/or reproduce information from a digital versatile disc (DVD).

In addition, the light source 15 may be configured to emit light in another wavelength range. Also, the light source 15 may be configured to emit light of a plurality of wavelengths such that the integrated optical system is compatible with a plurality of optical information storage media having different formats.

The wavelength of light emitted from the light source 15 may vary according to the type of information storage medium that is used. Therefore, the integrated optical system can record data on and/or reproduce data from various kinds of optical information storage media, for example, a CD-family optical disc, a DVD-family optical disc, a BD and/or an HD DVD.

The light source 15 may be an edge emitting type semiconductor laser that emits laser light in a direction parallel to semiconductor material layers.

Considering the light emitting structure of this type semiconductor laser, the light source 15 is mounted on a mount 13. Consequently, the light source 15 is mounted apart from a bottom surface 11 of the optical bench 10.

The light source 15 mounted on the mount 13 may be installed on the optical bench 10. Alternatively, the mount 13 may be formed to protrude from the bottom surface 11 of the optical bench 10 and then the light source 15 may be mounted on the mount 13. In the exemplary embodiment, the light source 15, which is a semiconductor laser, may be directly formed on the optical bench wafer for manufacturing the optical bench 10 using a semiconductor process.

During operation, the main photodetector 17 receives the light reflected by the information storage medium 1 and detects an information reproduction (RF) signal and an error signal (e.g., a focusing error signal, a tracking error signal, and/or a tilt error signal) used for servo driving. The main photodetector 17 may be disposed on the bottom surface 11 of the optical bench 10.

The monitor photodetector 19 monitors the intensity of light emitted from the light source 15. The monitor photodetector 19 may be disposed in front of the light source 15 to receive some of the light emitted from the light source 15 before the light passes through a reflection mirror. In the exemplary embodiment, the light emitted from the semiconductor laser used as the light source 15 is a diverging light having a Gaussian distribution. In practice, only central light in a predetermined center region of the diverging light emitted from the semiconductor laser is focused by an objective lens to be used for optical recording and/or reproduction, and peripheral light is not focused by the objective lens and is lost.

The monitor photodetector 19 receives part of the light with low intensity that is not focused by the objective lens and monitors the light output from the light source 15. The light received by the monitor photodetector 19 is emitted from the light source 15 and then directly impinges on the monitor photodetector 19 without passing through a separate mirror member.

As described later, although the monitor photodetector 19 is disposed on the bottom surface 11 of the optical bench in front of the light source 15, the monitor photodetector 19 can receive light with sufficient intensity to monitor the operation of the light source 15.

Accordingly, the monitor photodetector 19 can be disposed on the bottom surface 11 of the optical bench 10, parallel to the light source 15.

Alternatively, to increase the intensity of light received by the monitor photodetector 19, the monitor photodetector 19 may be slanted toward the light source 15 or may be disposed on a portion protruding from the bottom surface 11 of the optical bench 10. This can be achieved by providing the optical bench 10 with a slanted surface protruding from the bottom surface 11 on which the monitor photodetector 19 is installed, or forming a mount protruding from the bottom surface 11 and having a plane surface parallel to the light source 15. Alternatively, a mount on which the monitor photodetector 19 is mounted may be attached to the optical bench 10.

The main photodetector 17 and the monitor photodetector 19 may be directly formed on the optical bench wafer on which the optical bench 10 is formed, or may be separately manufactured and then installed on the optical bench 10.

Wires and pads 23 for electrical connection between the light source 15, the main photodetector 17, the monitor photodetector 19 and external circuits may be formed on the bottom surface 11 of the optical bench 10. The pads 23 are formed to make electrical contact with the external circuits. When the main photodetector 17 and the monitor photodetector 19 are directly formed on the optical bench wafer, the internal wires 21 and the pads 23 are formed on the optical bench 10 using a thin film process.

A heating structure (not shown) for radiating heat generated by an actuator (not shown) for driving the integrated optical pickup and/or the light source 15 may be installed on a top surface of the optical bench 10. In the exemplary embodiment, a heating structure may be further installed on a side surface of the optical bench 10, if necessary.

A receiving groove 25 with an opening 27 is formed at a side of the optical bench 10. The optical path separating member 50 may be inserted into the receiving groove 25.

The optical path separating member 50 separates the optical paths of the light emitted from the light source 15 and proceeding toward the lens unit 70 and the light incident from the lens unit 70.

As described above, the receiving groove 25 with the opening 27 may be formed in the optical bench 10, and the optical path separating member 50 may be inserted into the receiving groove 25. Alternatively, instead of forming the receiving groove 25 and inserting the optical path separating member 50 into the receiving groove 25, the optical path separating member 50 may be attached to a surface of the optical bench 10 with no receiving groove, or the optical path separating member 50 may be integrally formed with the lens unit 70.

In the exemplary embodiment, regardless of the existence of the receiving groove 25, the optical bench 10 has the opening 27 through which the light emitted from the light source 15 and then reflected by a first mirror 31 of the optical path forming unit 30 can pass to propagate toward the lens unit 70.

In the integrated optical system according to an exemplary embodiment of the present invention, the optical path separating member 50 separates optical paths by transmitting light directed to the information storage medium 1 without altering the light's path and diffracting light reflected by the information storage medium 1. The optical path separating member 50 allows the detection of a signal recorded on the information storage medium 1 and focusing and tracking error signals by diffracting the light reflected by the information storage medium 1 into a plurality of light beams, or adjusting a shape of a light spot formed on the main photodetector 17 and reflecting light to the main photodetector 17 for signal detection.

Figure 4A:
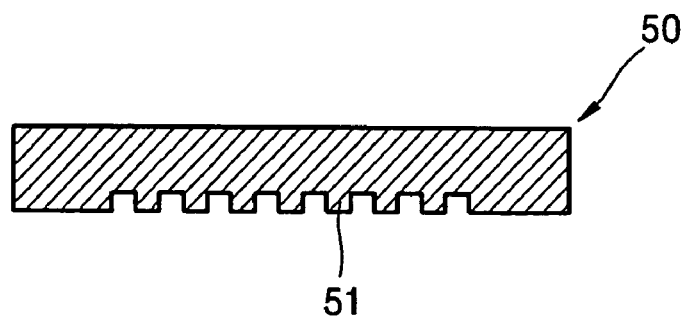
FIG. 4A is a cross-sectional view of an optical path separating member of the integrated optical system of FIG. 1 according to an exemplary embodiment of the present invention.

FIG. 4A illustrates an example where the optical path separating member 50 has a diffraction optical element 51, for example, a hologram optical element (HOE) or a diffractive optical element (DOE).

When the optical path separating member 50 has the diffraction optical element 51, the light reflected by the information storage medium 1 is diffracted by the optical path separating member 50 at an angle such that the light proceeds toward the main photodetector 17 distanced from the light source 15.

Figure 4B:
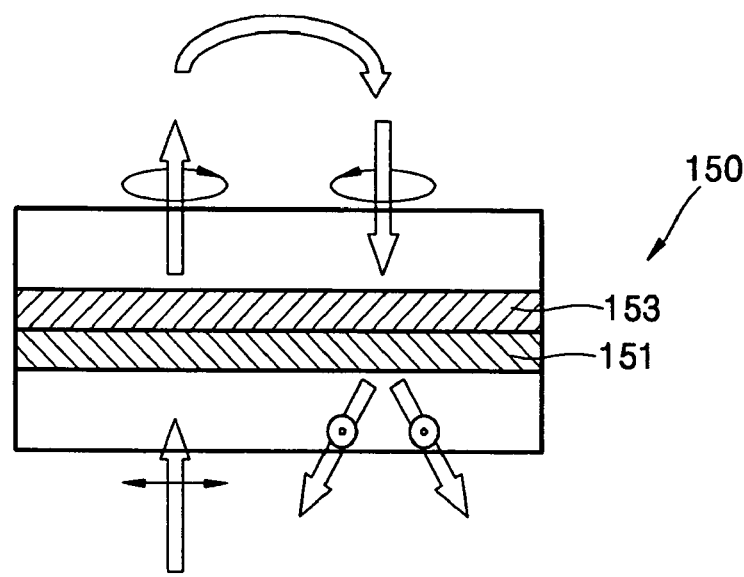
FIG. 4B is a cross-sectional view of the optical path separating member of the integrated optical system of FIG. 1 according to another exemplary embodiment of the present invention.

The integrated optical system according to the exemplary embodiment of the present invention may comprise a polarization selectivity optical path separating member 150 as shown in FIG. 4B instead of the optical path separating member 50 with the diffraction optical element 51.

The polarization selectivity optical path separating member 150 comprises a polarization diffraction element 151, which is a polarization holographic element that selectively linearly transmits or diffractively transmits incident light depending on the polarization of the incident light, and a quarter-wave plate 153, which changes the polarization of the incident light.

The semiconductor laser used as the light source 15 emits laser light has a predominant linearly polarized component. Thus, substantially s-polarized or p-polarized light may be emitted from the semiconductor laser.

Accordingly, if the polarization diffraction element 151 is configured to transmit linearly polarized light emitted from the light source 15 without altering the light's path, the light transmitted through the polarization diffraction element 151 is changed into first circularly polarized light after passing through the quarter-wave plate 153 and then into second circularly polarized light, which is orthogonal to the first circularly polarized light, after being reflected by the optical information storage medium 1. The second circularly polarized light is changed into another linearly polarized light after passing through the quarter-wave plate 153 and then is diffracted by the polarization diffraction element 151.

Accordingly, the optical path of the light proceeding toward the optical information storage medium 1 and the optical path of the light reflected by the optical information storage medium 1 can be separated from one another by the polarization selectivity optical path separating member 150. In this regard, the polarization selectivity optical path separating member 150 diffracts only the light reflected by the information storage medium 1, without affecting the light emitted directly from the light source 15, thereby increasing efficiency.

The optical path forming unit 30 comprises the first mirror 31, which reflects the light emitted from the light source 15 to the lens unit 70, and a second mirror 35, which reflects the light incident from the lens unit 70 reflected by the first mirror 31 to the main photodetector 17. The light source 15 may be disposed between the first and second mirrors 31 and 35.

The optical path forming unit 30 comprises the two mirrors 31 and 35 as shown in FIGS. 1 and 2, and is adapted to control an optical path of the light emitted from the light source 15 such that a focal point is formed on the information storage medium 1 through the objective lens of the lens unit 70 and to transmit the light reflected by the information storage medium 1 to the main photodetector 17.

The optical path forming unit 30 may be manufactured using a wafer process. That is, as described later, the optical path forming unit 30 may be formed by processing a plurality of mirrors on an optical path forming unit wafer. An optical bench and optical path forming unit assembly may be formed by bonding the optical path forming unit wafer on which the at least one optical path forming unit 30 is formed to the optical bench wafer and dicing the bonded wafers, or the optical path forming unit 30 may be formed by dicing the optical path forming unit wafer by mirrors and then attaching the mirrors at proper positions to the optical bench 10.

The lens unit 70 may be coupled to one side of the top surface of the optical bench 10. The lens unit 70 may comprise at least one of a refractive lens, a diffractive lens and a gradient index-(GRIN) lens.

Figure 5:
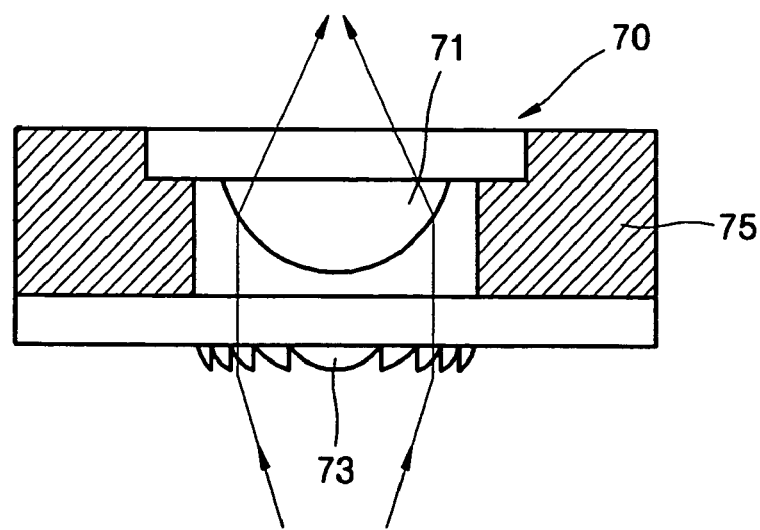
FIG. 5 is a cross-sectional view of a lens unit of the integrated optical system of FIG. 1 according to an exemplary embodiment of the present invention.

Referring to FIG. 5, the lens unit 70 may comprise a hybrid lens comprising a refractive lens 71 and a diffractive lens 73. In the exemplary embodiment, the refractive lens 71 may be inserted into a lens holder 75 and the diffractive lens 73 may be formed at one surface of the lens holder 75.

Referring to FIG. 5, the lens unit 70 may be formed by perforating a silicon substrate to form the lens holder 75 having an opening to assemble the refractive lens 71, forming the diffractive lens 73 on a glass substrate, inserting the refractive lens 71 into the opening of the lens holder 75 and attaching the diffractive lens 73 to one surface of the lens holder 75.

An objective lens focuses the light emitted from the light source 15 and forms a light spot smaller than a diffraction limit to record a signal on the information storage medium 1 and read the recorded signal. The refractive lens 71 and the diffractive lens 73 may be designed to function as an objective lens for incident diverging light. Accordingly, if the hybrid lens comprising the diffractive lens 73 and the refractive lens 71 is used as the objective lens, the refractive lens 71 can be easily manufactured and better correction of chromatic aberration can be achieved. In the exemplary embodiment, although the refractive lens 71 and the diffractive lens 73 are independent parts in FIG. 5, the hybrid lens comprising the refractive lens 71 and the diffractive lens 73 that are integrally formed with each other may be used as the objective lens.

On the other hand, the diffractive lens 73, as shown in FIG. 5, may be formed at a bottom surface of the lens holder 75. The diffractive lens 73 may be designed to collimate a beam.

In this case, if the refractive lens 71 is installed into the lens holder 75, the diffractive lens 73 functions as a collimating lens that collimates incident diverging light and the refractive lens 71 functions as an objective lens that focuses the light collimated by the diffractive lens 73.

In the exemplary embodiment, when the lens unit 70 comprises the hybrid lens in which the refractive lens 71 and the diffractive lens 73 are combined, the hybrid lens can relieve aberration, such as chromatic aberration and spherical aberration, whether the hybrid lens acts as both an objective lens and a collimating lens or acts as only an objective lens. For example, the diffractive lens 73 has a greater diffraction angle with respect to longer wavelength light, and the refractive lens 71 has a smaller refraction angle with respect to longer wavelength light. Accordingly, by combining the diffractive lens 73 and the refractive lens 71, an occurrence of chromatic aberration due to a variation in the wavelength of light can be suppressed.

Figure 6:
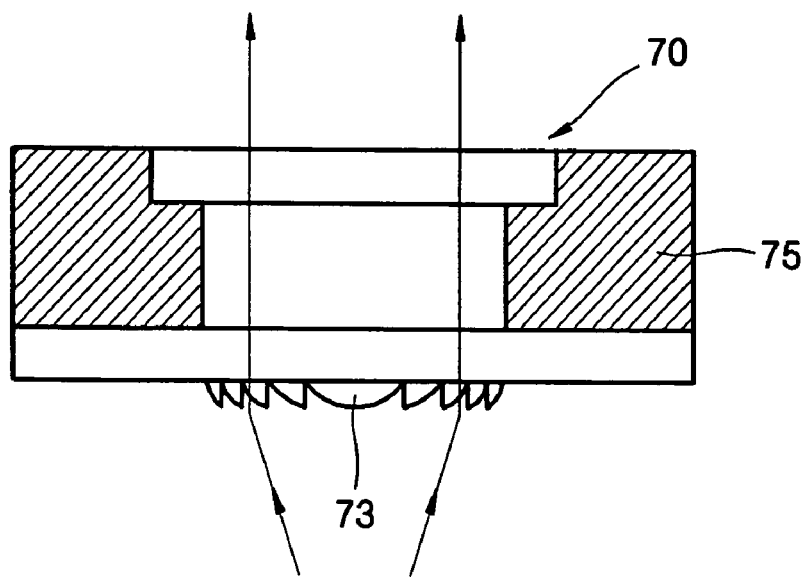
FIG. 6 is a cross-sectional view of the lens unit of the integrated optical system of FIG. 1 according to another exemplary embodiment of the present invention.

When the diffractive lens 73 is designed to collimate a beam, the lens unit 70 functions as a collimating lens in the state where the refractive lens 71 is not assembled into the lens holder 75, as shown in FIG. 6.

Figure 7:
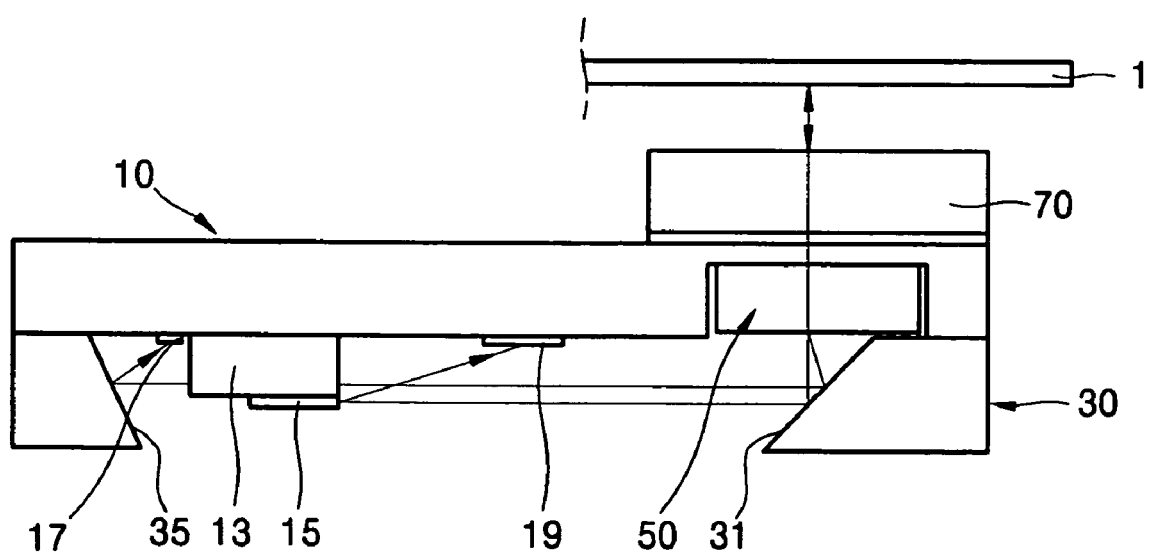
FIG. 7 is a side view illustrating an example where the integrated optical system of FIG. 1 including the lens unit of FIG. 5 is used as an integrated optical pickup.

Accordingly, when the refractive lens 71 is inserted into the lens holder 75 of the lens unit 70, the integrated optical system according to the present invention can be used as an integrated optical pickup as illustrated in FIG. 7.

Figure 8:
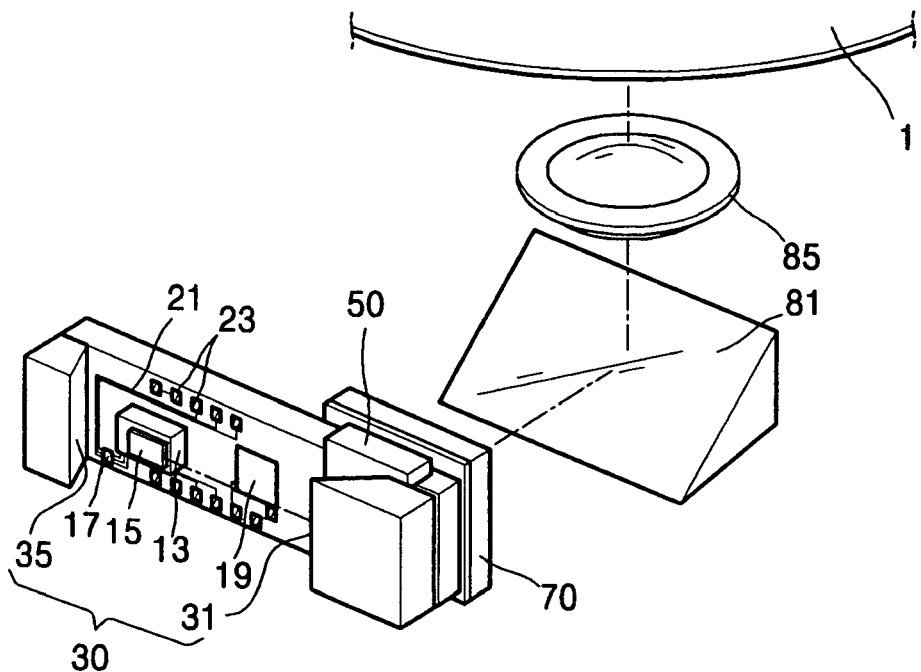
FIG. 8 is a perspective view illustrating an example where the integrated optical system of FIG. 1 comprising the lens unit of FIG. 6 is used as an optical pickup module.

Further, when the refractive lens 71 is not inserted into the lens holder 75 of the lens unit 70, the integrated optical system according to the present invention may be used as an optical pickup module for an optical pickup as shown in FIG. 8.

FIG. 7 is a diagram illustrating an example where the integrated optical system according to the present invention is used as an integrated optical pickup. Referring to FIG. 7, the lens unit 70 comprises both the refractive lens 71 and the diffractive lens 73 shown in FIG. 5.

When the integrated optical system is used as the integrated optical pickup as shown in FIG. 7, the whole integrated optical system is focused, tracked and/or tilted by the actuator.

FIG. 8 is a diagram illustrating an example where the integrated optical system according to an exemplary embodiment of the present invention is used as the optical module for an optical pickup. Referring to FIG. 8, the lens unit 70 may include the diffractive lens 73 designed to act as a collimating lens but not include the refractive lens 71 designed to act as an objective lens.

In the exemplary embodiment, the diffractive lens 73 designed to act as a collimating lens may be formed on a separate substrate and attached to the opening of the optical bench 10 or may be integrally formed with the optical path separating member 50.

In the exemplary embodiment, the lens unit 70 may use a refractive lens, a diffractive lens or a GRIN lens as the collimating lens, and in this case, the integrated optical system can be used as an optical module for an optical module.

When the integrated optical system is used as the optical module as shown in FIG. 8, the optical pickup may further comprise a reflection mirror 81 reflecting light emitted from the optical module and an objective lens 85 focusing the light reflected by the reflection mirror 81 and forming a spot on the information storage medium 1. In this case, only the objective lens 85 can be focused, tracked and/or tilted by the actuator.

Therefore, the integrated optical system according to the present invention can be easily converted between the optical pickup and the optical module for an optical pickup during manufacturing. That is, the integrated optical system can be selectively used as the optical module for the optical pickup or the optical pickup by selectively inserting the refractive lens 71 into the lens holder 75 having one surface on which the diffractive lens 73 is formed.

Also, when the lens holder 75 is used as shown in FIGS. 5 and 6, the lens unit 70 can be easily coupled to the optical bench 10 by simply attaching the lens holder 75 to the optical bench 10.

Although the diffractive lens 73 is used in the above description, a refractive lens functioning as a collimating lens may be used instead of the diffractive lens 73.

In the integrated optical system according to the present invention, some intensity portion of light emitted from the light source 15, that is, from the semiconductor laser, is reflected by the first mirror 31 and then focused on the information storage medium 1 through the objective lens, that is, the refractive lens 71 functioning as the objective lens of the lens unit 70 or the separate objective lens 85 (see FIG. 8). Some low intensity portion of light emitted from the light source 15 and not collected by the objective lens is transmitted to the monitor photodetector 19 to monitor the intensity of light emitted from the light source 15.

Light reflected by the information storage medium 1 passes through the objective lens, is divided into a plurality of beams or is adjusted the shape of a spot focused on the main photodetector 17, and is changed proceeding direction by the optical path separating member 50, is reflected by the first mirror 31, and reaches the second mirror 35 without interfering with the light source 15 and the sub mount 13 of the light source 15. Light reflected by the second mirror 35 is formed on the main photodetector 17 for signal detection to detect a signal recorded on the information storage medium 1 and/or focusing and tracking errors of the information storage medium 1.

Since the integrated optical system according to the present invention has a simpler structure than a conventional optical pickup, and a MEMS process can be used to manufacture most parts, that is, the optical bench and the optical path forming unit of the integrated optical system, a plurality of the integrated optical systems can be simultaneously manufactured on a wafer, and can be more easily adjusted and assembled than for a conventional optical pickup. Also, since the structure is simple and the most parts are integrated, the size of the optical pickup can be reduced.

A method of manufacturing the integrated optical system according to the present invention will now be explained.

First, the optical bench 10 can be manufactured as follows. After the main photodetector 17 and the monitor photodetector 19 are directly formed on the optical bench wafer, the internal wires 21 and the pads 23 are formed through a thin film process. To mount the light source 15, i.e., the semiconductor laser, on the optical bench 10, the sub mount 13 to which the light source 15 is bonded is manufactured, and the sub mount 13 is bonded to the bottom surface 11 of the optical bench 10 on which the main photodetector 17 and the monitor photodetector 19 are disposed. The wires 21 are connected by wire bonding, if necessary. Alternatively, the main photodetector 17 and the monitor photodetector 19 may be separately manufactured and then bonded to the bottom surface 11 of the optical bench 10, and the light source 15 may be directly formed on the optical bench 10 through a semiconductor process.

The optical path forming unit 30 comprising the first and second mirrors 31 and 35 is manufactured through a wafer process, that is, the first and second mirrors 31 and 35 are in array formed on the wafer by etching the optical path forming unit wafer or molding polymer or glass.

After the optical bench wafer on which the optical bench 10 is formed and the optical path forming unit wafer on which the optical path forming unit 30 including the first and second mirrors 31 and 35 is formed are manufactured, the optical path forming unit wafer and the optical bench wafer are aligned, bonded, and diced to obtain an optical bench and optical path forming unit assembly.

By coupling the optical path separating member 50 and the lens unit 70 to each optical bench and optical path forming unit assembly die, the integrated optical system used as the optical pickup or the optical module can be manufactured.

In the exemplary embodiment, the lens unit 70 and the optical path separating member 50 are coupled to the optical bench 10 by centering the lens unit 70 (e.g., the objective lens) and adjusting the optical path separating member 50 and the lens unit 70 so that light can be properly received by the main photodetector 17. When the lens unit 70 and the optical path separating member 50 are coupled to the optical bench 10 through this adjustment process, the integrated optical system according to the present invention is obtained.

Alternatively, to manufacture the integrated optical system, the optical bench wafer on which the optical bench 10 is formed is prepared, and mirrors which are manufactured through a wafer process or are separately manufactured are attached at appropriate positions to the optical bench 10 on the optical bench wafer to form a structure in which the first and second mirrors 31 and 35 of the optical path forming unit 30 are attached to the optical bench 10. Subsequently, the optical bench wafer to which the optical path forming unit 30 is attached is diced to obtain an optical bench and optical path forming unit assembly.

In the exemplary embodiment, the mirrors 31 and 35 constituting the optical path forming unit 30 may be processed in an array from on the optical path forming unit wafer through a wafer process. The optical path forming unit wafer is diced into mirrors, the mirrors are separated and then attached at appropriate positions to the optical bench wafer, and the optical bench wafer is diced, to obtain the optical bench and optical path forming unit assembly. Alternatively, the optical bench wafer may be first diced, and the mirrors may be attached at appropriate positions to each of the optical benches to obtain an optical bench and optical path forming unit assembly.

In the exemplary embodiment, the objective lens of the lens unit 70 may be first fixed to the optical bench 10 and then the first and second mirrors 31 and 35 of the optical path forming unit 30 may be attached to the optical bench 10. In this case, after the objective lens is fixed, the position of the first mirror 31 is determined according to the position of the objective lens. Next, the optical path separating member 50 is adjusted so that the main photodetector 17 can properly receive light and the optical path separating member 50 can be inserted into the optical bench 10 to obtain the integrated optical system according to the present invention.

Alternatively, the objective lens and the optical path separating member 50 may be first fixed to the optical bench 10 and then the first mirror 31 and the second mirror 35 may be attached to the optical bench 10. In this case, after the objective lens is fixed, the position of the first mirror 31 is determined according to the position of the objective lens and the position of the second mirror 35 is determined so that light can be properly received by the main photodetector 17.

While methods of manufacturing the integrated optical system according to the present invention have been explained in detail, the present invention is not limited thereto, and various modifications falling within the spirit and scope of the appended claims can be made.

Examples of various arrangements of the monitor photodetector 19 in the integrated optical system according to the present invention will now be explained. The monitor photodetector 19 is disposed in front of the light source as described above.

Figure 9:
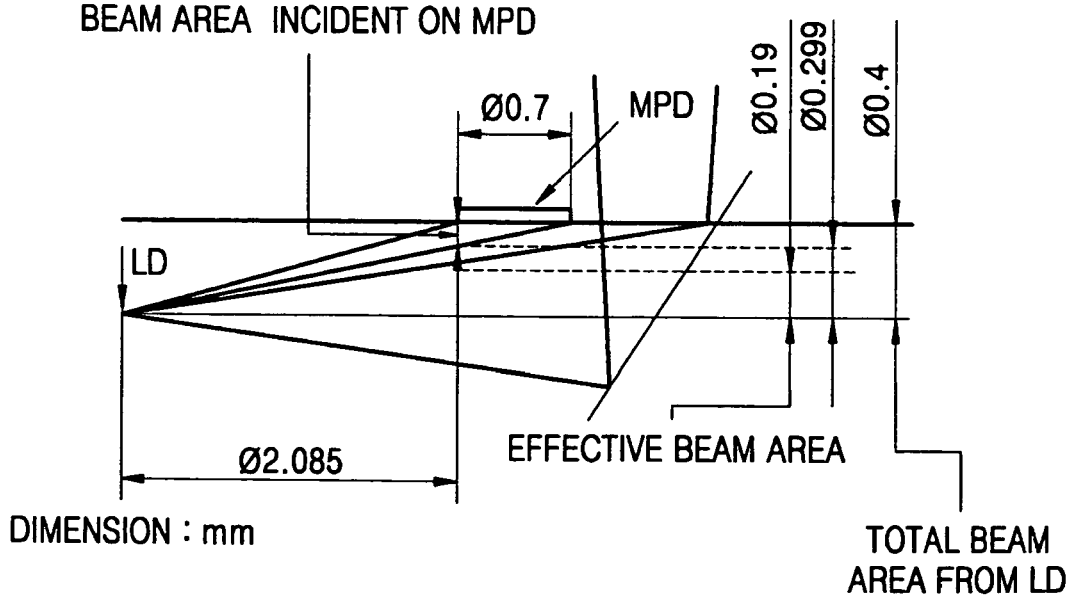
FIG. 9 is a diagram illustrating the case where a monitor photodetector is disposed on a bottom surface of an optical bench and parallel to a light source.
Figure 10:
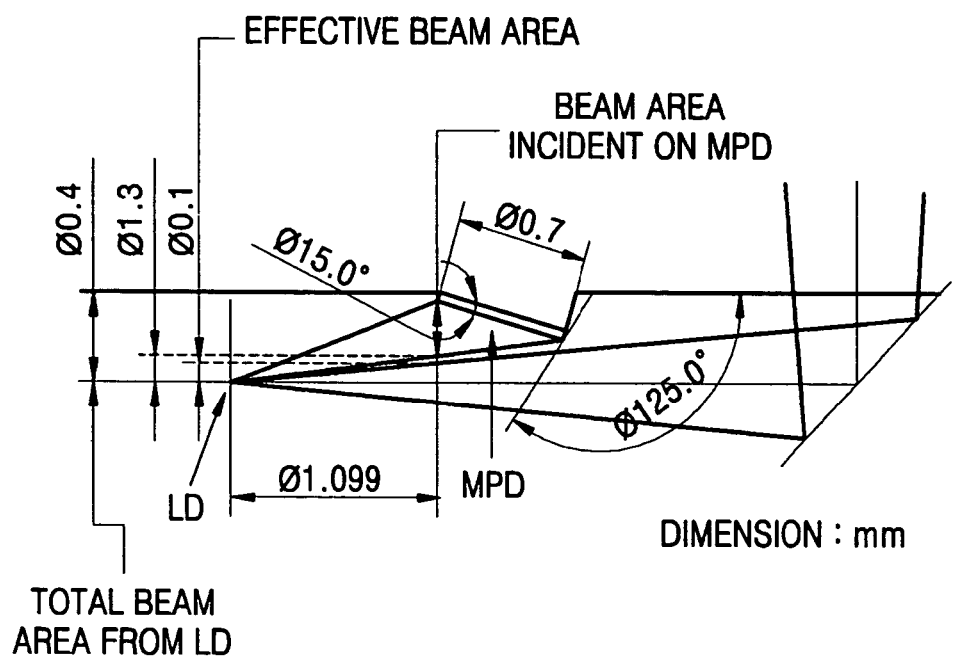
FIG. 10 is a diagram illustrating the case where a monitor photodetector is slanted toward a light source.
Figure 11:
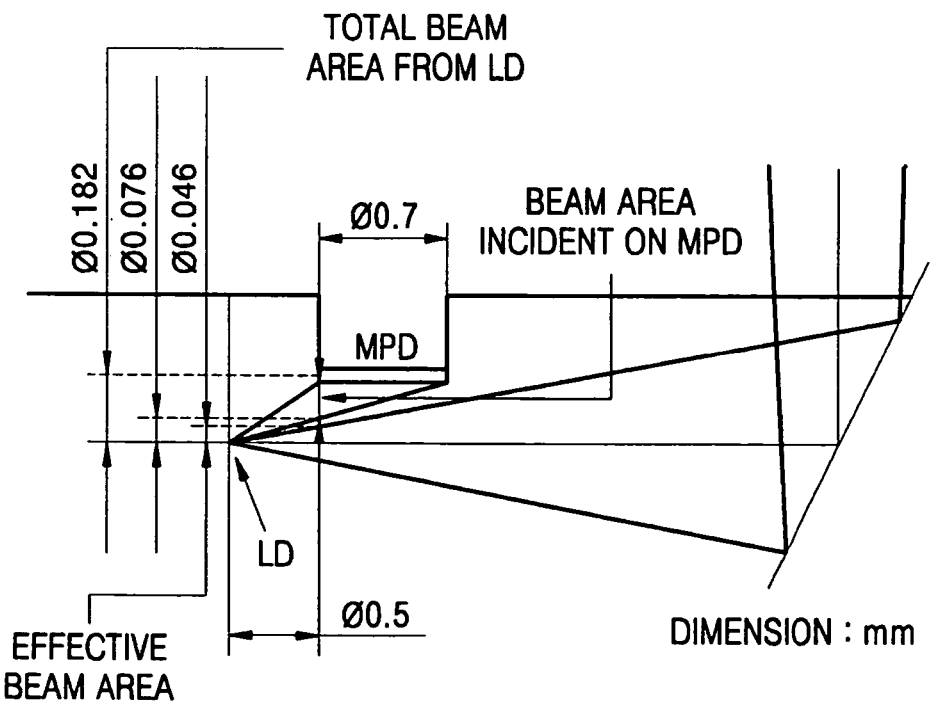
FIG. 11 is a diagram illustrating the case where a monitor photodetector is disposed on a portion protruding from a bottom surface of an optical bench and parallel to a light source.

FIGS. 9 through 11 respectively illustrate examples in which the monitor photodetector 19 is disposed on the bottom surface 11 of the optical bench 10 and parallel to the light source 15, the monitor photodetector 19 is slanted toward the light source 15, and the monitor photodetector 19 is disposed on a portion protruding from the bottom surface 11 of the optical bench 10 and parallel to the light source 15. FIGS. 9 through 11 illustrate examples in which the width of the effective light receiving area of the monitor photodetector 19 is 0.7 mm. Referring to FIGS. 9 through 11, LD denotes a light emitting point of the light source 15, MPD denotes the monitor photodetector 19, effective beam area denotes the portion of the beam-used for information recording and/or reproduction, and beam area incident on MPD denotes the portion of the beam incident on the effective light receiving area of the monitor photodetector 19.

Table 1 shows the ratios of the intensity of light received by the monitor photodetector 19 to the total light emitted from the light source 15 respectively when the monitor photodetector 19 is positioned relatively to the light source 19 as shown in FIGS. 9 through 11 and the effective light receiving area of the monitor photodetector 19 is 0.7 mm and 0.5 mm.

TABLE 1

| Position of MPD | Ratio of amount of light (energy) received by MPD | |
|---|---|---|
| | MPD effective light receiving area $\Phi = 0.7$ mm | MPD effective light receiving area $\Phi = 0.5$ mm |
| Disposed on bottom surface and parallel to LD | 6.9% | 4.75% |
| Slanted toward LD | 23.1% | 22.58% |
| Disposed on portion protruding from bottom surface of optical bench and parallel to LD | 17.96% | 13.58% |

Referring to Table 1, when the width of the effective light receiving area of the monitor photodetector 19 is 0.7 mm, the ratio of the amount of light received by the monitor photodetector 19 is 6.9%, 23.1% and 17.96% respectively in FIGS. 9, 10, and 11. When the width of the effective light receiving area of the monitor photodetector 19 is 0.5 mm, the ratio of the intensity of light received by the monitor photodetector 19 is 4.75%, 22.58% and 13.58% respectively in FIGS. 9, 10, and 11.

It is known that when the amount of light received by the monitor photodetector 19 ranges from 5% to 10% of the total light emitted from the light source 15, the total amount of light emitted from the light source 15 can be monitored.

Considering this, when the monitor photodetector 19 is disposed on the bottom surface 11 of the optical bench 10, which is spaced 2.085 mm from the light source 15 so that the width of the effective light receiving area is 0.7 mm, the ratio of light received by the monitor photodetector 19 is 6.9%. Accordingly, light of sufficient amount for monitoring can be received.

Referring to FIG. 9, when the monitor photodetector 19 is disposed on the bottom surface 11 of the optical bench 10, if the monitor photodetector 19 is distanced farther from the light source 15, the width of the effective light receiving area may be less than 0.7 mm. Further, if the monitor photodetector 19 is brought closer to the light source 15, the width of the effective light receiving area may be greater than 0.7 mm.

FIG. 9 illustrates a specific design example. Accordingly, the distance between the monitor photodetector 19 and the light source 15, and the effective light receiving area are not limited to the example illustrated in FIG. 9, and various modifications can be made within a range where light of sufficient amount for monitoring can be received.

Referring to FIG. 10, when the monitor photodetector 19 is disposed at a point spaced 1.099 mm from the light source 15 and slanted at 15 degrees toward the light source 15 so that the width of the effective light receiving area is 0.7 mm, the ratio of light received by the monitor photodetector 19 is 23.1%. Under the same conditions, when the width of the effective light receiving area of the monitor photodetector 19 is 0.5 mm, the ratio of light received by the monitor photodetector 19 is 22.58%.

When the monitor photodetector 19 is slanted toward the light source 15 as shown in FIG. 10, even if the amount of light received by the monitor photodetector 19 is reduced, monitoring can be conducted. Accordingly, the monitor photodetector 19 may be slanted at an angle less than 15 degrees or the monitor photodetector 19 may be positioned closer to the light source 15.

FIG. 10 illustrates a specific design example. Accordingly, the distance between the monitor photodetector 19 and the light source 15, the effective light receiving area, and the slanting angle of the monitor photodetector 19 are not limited to the example illustrated in FIG. 10, and various modifications can be made within a range where light of sufficient amount for monitoring can be received.

When the monitor photodetector 19 is disposed on a portion protruding 0.218 mm from the bottom surface 11 of the optical bench 10 and spaced 0.5 mm from the light source 15 so that the width of the effective light receiving area can be 0.7 mm as shown in FIG. 11, the ratio of light received by the monitor photodetector 19 is 17.96%. Under the same conditions, when the width of the effective light receiving area of the monitor photodetector 19 is 0.5 mm, the ratio of light received by the monitor photodetector 19 is 13.58%.

When the monitor photodetector 19 is disposed at the portion protruding from the bottom surface 11 of the optical bench 10 as shown in FIG. 11, even if the amount of light received by the monitor photodetector 19 is reduced, monitoring can be conducted. Accordingly, the protrusion of the monitor photodetector 19 may be less than 0.218 mm as indicated in FIG. 11, or the monitor photodetector 19 may be closer to the light source 15.

FIG. 11 illustrates a specific design example. The distance between the monitor photodetector 19 and the light source 15, the distance between the monitor photodetector 19 and the bottom surface 11 of the optical bench 10, and the effective light receiving area are not limited to the example illustrated in FIG. 11, and various modifications can be made within a range where light of sufficient amount for monitoring can be received.

It can be seen from Table 1 that the monitor photodetector 19 may be disposed on the bottom surface 11 of the optical bench 10 in front of the light source 15, and in this case, the structure to dispose the monitor photodetector 19 can be simple.

Also, the monitor photodetector 19 may be slanted toward the light source 15, or disposed on the portion protruding from the bottom surface 11 of the optical bench 10.

Figure 12:
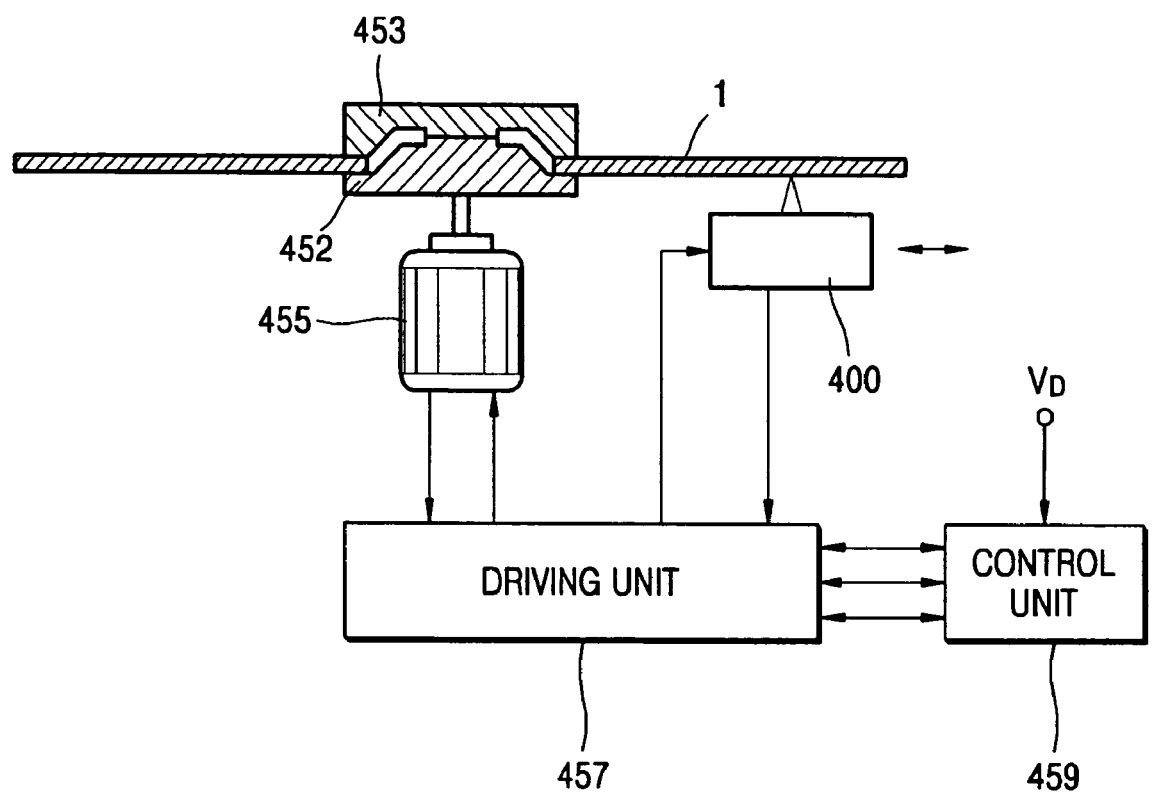
FIG. 12 is a schematic diagram of an information recording and/or reproducing apparatus employing the integrated optical system according to an exemplary embodiment the present invention.

FIG. 12 is a schematic view of an information recording and/or reproducing apparatus employing the integrated optical system according to the present invention.

Referring to FIG. 12, the information recording and/or reproducing apparatus comprises a rotating unit including a spindle motor 455 rotating an information storage medium 1 (e.g., an optical disc), an optical pickup 400 installed to be movable in a radial direction of the information storage medium 1 and reproducing information recorded on the information storage medium 1 and/or recording information, a driving unit 457 driving the rotating unit and the optical pickup 400, and a control unit 470 controlling the driving unit 457 to control focusing and tracking servos of the optical pickup 450. The apparatus further includes a turntable 452, and a clamp 453 chucking the information storage medium 1.

The optical pickup 400 includes the integrated optical system according to an exemplary embodiment of the present invention. That is, the optical pickup 400 may be the integrated optical system according to the present invention when the integrated optical system is formed to function as an optical pickup as shown in FIG. 7.

Alternatively, the optical pickup 400 may comprise the integrated optical system according to the present invention when the integrated optical system is formed to function as an optical module as shown in FIG. 8.

Light reflected by the information storage medium 1 is detected by the main photodetector 17 mounted on the optical pickup 400 and converted into an electrical signal through photoelectric conversion. The electrical signal is input to the control unit 459 via the driving unit 457. The driving unit 457 controls the rate of rotation of the spindle motor 455, amplifies the input signal and drives the optical pickup 400. The control unit 459 transmits a focusing servo command and a tracking servo command, both of which are adjusted based on the signal input from the driving unit 457, to the driving unit 457 again to implement a focusing and tracking servo operation of the optical pickup 400. Further, the control unit 459 uses the light amount signal detected by the monitor photodetector 19 and controls the light output from the light source 15 so that light of proper amount can be emitted from the light source 15.

When an optical pickup according to any one of embodiments of the present invention is used, a small, slim information recording and/or reproducing apparatus can be realized.

Accordingly, the information recording and/or reproducing apparatus employing the optical pickup according to the present invention can be applied to a portable terminal, such as a personal digital assistant (PDA), a mobile phone, a digital camera, a portable disc player or a camcorder.

While the integrated optical system, the method thereof, and the information recording and/or reproducing apparatus using the integrated optical system as the optical module or the optical pickup have been described with reference to the appended drawings, the present invention is not limited thereto, and various modifications can be conducted within the technical scope of the claims.

Since the integrated optical system according to the present invention can satisfy requirements for small, slim devices, and can be integrated using a MEMS process, a plurality of integrated optical systems can be simultaneously manufactured on a wafer and can be more easily adjusted and assembled than conventional optical pickups. Additionally, since the structure is simple and most of the parts can be integrated, the size of the optical pickup can be reduced.

Furthermore, when the lens unit is structured such that a lens functioning as a collimating lens is formed on one surface of the lens holder and a refractive lens functioning as an objective lens can be selectively inserted into the lens holder, the integrated optical system according to the present invention can be easily converted for use as an optical module and an integrated optical pickup according to the formation of the diffractive lens and the existence of the refractive lens.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An integrated optical system comprising:
   an optical bench comprising a light source that generates light and at least one photodetector comprising a main photodetector that receives light;
   a lens unit coupled to the optical bench;
   an optical path separating member separating an optical path of light emitted from the light source and propagating toward the lens unit and an optical path of light incident from the lens unit; and
   an optical path forming unit coupled to the optical bench, wherein the optical path forming unit comprises a first mirror that reflects the light emitted from the light source to the lens unit and a second mirror reflecting the light incident from the lens unit and reflected by the first mirror to the main photodetector.

2. The integrated optical system of claim 1, wherein the at least one photodetector further comprises a monitor photodetector disposed on the optical bench that receives a portion of the light emitted from the light source.

3. The integrated optical system of claim 2, wherein the main photodetector and the monitor photodetector are disposed on a bottom surface of the optical bench, and the light source is mounted on a mount and spaced apart from the bottom surface of the optical bench.

4. The integrated optical system of claim 2, wherein the monitor photodetector is mounted to be parallel to the light source, slanted toward the light source or spaced apart from the bottom surface of the optical bench.

5. The integrated optical system of claim 1, wherein the light source is mounted on a mount.

6. The integrated optical system of claim 1, wherein the light source is interposed between the first and second mirrors.

7. The integrated optical system of claim 1, wherein the optical path separating member comprises a diffraction optical element.

8. The integrated optical system of claim 1, wherein the optical path separating member comprises a polarization diffraction element and a quarter-wave plate.

9. The integrated optical system of claim 1, wherein a receiving groove with an opening is disposed in the optical bench, and the optical path separating member is disposed in the receiving groove.

10. The integrated optical system of claim 1, further comprising a plurality of connection elements for electrically connecting the light source and the at least one photodetector and external circuits, wherein the connection elements are disposed on a substrate of the optical bench.

11. The integrated optical system of claim 1, wherein an opening through which the light emitted from the light source and reflected by the first mirror passes toward the lens unit is disposed in the optical bench.

12. A method of manufacturing the integrated optical system of claim 1, the method comprising:
   preparing an optical bench wafer on which the optical bench is formed;
   preparing an optical path forming unit wafer on which the optical path forming unit is formed;
   bonding the optical path forming unit wafer to the optical bench wafer; and
   dicing the bonded wafers to obtain an optical bench and optical path forming unit assembly.

13. The method of claim 12, wherein the at least one photodetector further comprises a monitor photodetector disposed on the optical bench that receives a portion of the light from the light source.

14. The method of claim 13, wherein the main photodetector and the monitor photodetector are disposed on a bottom surface of the optical bench, and the light source is mounted on a mount and spaced apart from the bottom surface of the optical bench.

15. The method of claim 13, wherein the monitor photodetector is mounted to be parallel to the light source, slanted toward the light source or spaced apart from the bottom surface of the optical bench.

16. The method of claim 13, wherein connection elements for electrically connecting the light source, the at least one photodetector and external circuits are formed on a substrate of the optical bench.

17. A method of manufacturing the integrated optical system of claim 1, the method comprising:
preparing an optical bench wafer on which the optical bench is formed;
attaching the optical path forming unit to the optical bench formed on the optical bench wafer; and
dicing the optical bench wafer to which the optical path forming unit is attached to obtain an optical bench and optical path forming unit assembly.

18. The method of claim 17, wherein the optical path forming unit is formed on a wafer.

19. The method of claim 17, wherein the at least one photodetector comprises a monitor photodetector disposed on the optical bench that receives a portion of the light from the light source.

20. The method of claim 19, wherein the main photodetector and the monitor photodetector are disposed on a bottom surface of the optical bench, and the light source is mounted on a mount and spaced apart from the bottom surface of the optical bench.

21. The method of claim 19, wherein the monitor photodetector is mounted to be parallel to the light source, slanted toward the light source or spaced apart from the bottom surface of the optical bench.

22. A method of manufacturing the integrated optical system of claim 1, the method comprising:
preparing an optical bench wafer on which the optical bench is formed;
dicing the optical bench wafer; and
attaching the optical path forming unit to the optical bench to obtain an optical bench and optical path forming unit assembly.

23. The method of claim 22, wherein the at least one photodetector further comprises a monitor photodetector disposed on the optical bench that receives a portion of the light from the light source.

24. The method of claim 23, wherein the main photodetector and the monitor photodetector are disposed on a bottom surface of the optical bench, and the light source is mounted on a mount to be spaced apart from the bottom surface of the optical bench.

25. The method of claim 23, wherein the monitor photodetector is mounted to be parallel to the light source, slanted toward the light source or spaced apart from the bottom surface of the optical bench.

26. An information recording and/or reproducing apparatus comprising:
the integrated optical system of claim 1;
an information storage medium rotating unit rotating an information storage medium;
a driving unit driving the integrated optical system and the information storage medium rotating unit; and
a control unit controlling the driving unit to control focusing and tracking servos.

27. The information recording and/or reproducing apparatus of claim 26, wherein the lens unit comprises a hybrid lens comprising a refractive lens and a diffractive lens, and the integrated optical system is used as an optical pickup.

28. The information recording and/or reproducing apparatus of claim 26, wherein the lens unit comprises a refractive lens functioning as an objective lens and a diffractive lens functioning as a collimating lens, the refractive lens is inserted into a lens holder, the diffractive lens is disposed at one surface of the lens holder, and the integrated optical system is used as an optical pickup.

29. The information recording and/or reproducing apparatus of claim 26, further comprising an objective lens focusing incident light on the information storage medium, wherein the lens unit functions as a collimating lens, and the integrated optical system is used as an optical module.

30. The information recording and/or reproducing apparatus of claim 29, wherein the lens unit comprises a diffractive lens functioning as a collimating lens formed at one surface of a lens holder.

31. The information recording and/or reproducing apparatus of claim 26, wherein the at least one photodetector further comprises a monitor photodetector disposed on the optical bench that receives a portion of the light from the light source.

32. The information recording and/or reproducing apparatus of claim 31, wherein the main photodetector and the monitor photodetector are disposed on a bottom surface of the optical bench, and the light source is mounted on a mount and spaced apart from the bottom surface of the optical bench.

33. The information recording and/or reproducing apparatus of claim 31, wherein the monitor photodetector is disposed to be parallel to the light source, slanted toward the light source or spaced part from the bottom surface of the optical bench.

* * * * *